United States Patent
Nakayama et al.

(10) Patent No.: US 11,870,963 B2
(45) Date of Patent: Jan. 9, 2024

(54) IMAGE FORMING APPARATUS

(71) Applicant: TOSHIBA TEC KABUSHIKI KAISHA, Tokyo (JP)

(72) Inventors: Fumiharu Nakayama, Yokohama Kanagawa (JP); Takashi Tomiyama, Sunto Shizuoka (JP); Yuki Koike, Sunto Shizuoka (JP); Toshihiro Imai, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/892,795

(22) Filed: Aug. 22, 2022

(65) Prior Publication Data

US 2022/0400185 A1 Dec. 15, 2022

Related U.S. Application Data

(63) Continuation of application No. 17/241,807, filed on Apr. 27, 2021, now Pat. No. 11,457,119.

(30) Foreign Application Priority Data

Aug. 14, 2020 (JP) ................. 2020-136943

(51) Int. Cl.
*H04N 1/32* (2006.01)
*H01Q 1/22* (2006.01)
*H01Q 15/24* (2006.01)
*H04N 1/00* (2006.01)

(52) U.S. Cl.
CPC ....... *H04N 1/32138* (2013.01); *H01Q 1/2208* (2013.01); *H01Q 15/246* (2013.01); *H04N 1/00411* (2013.01); *H04N 1/00482* (2013.01); *H04N 1/00602* (2013.01)

(58) Field of Classification Search
None
See application file for complete search history.

(56) References Cited

U.S. PATENT DOCUMENTS

| | | | |
|---|---|---|---|
| 2007/0003340 A1* | 1/2007 | Yoshino | G03G 21/046 |
| | | | 399/366 |
| 2007/0070383 A1 | 3/2007 | Fujimori et al. | |
| 2009/0122350 A1 | 5/2009 | Alverson et al. | |
| 2018/0024796 A1 | 1/2018 | Hamakawa | |
| 2019/0232683 A1* | 8/2019 | Koike | B41J 3/50 |

FOREIGN PATENT DOCUMENTS

| | | |
|---|---|---|
| JP | 2007203487 A | 8/2007 |
| JP | 2010061314 A | 3/2010 |

OTHER PUBLICATIONS

Extended European Search Report dated Nov. 9, 2021, mailed in counterpart European Application No. 21179464.9, 5 pages.

* cited by examiner

*Primary Examiner* — Frantz Bataille

(74) *Attorney, Agent, or Firm* — Kim & Stewart LLP

(57) ABSTRACT

According to an embodiment, an image forming apparatus includes a sheet conveyance unit that is configured to transport a print medium along a conveyance path. An antenna is configured to emit radio waves towards a predetermined portion of the conveyance path. A controller is configured to control the antenna to emit the radio waves towards the predetermined portion with a polarization direction set according to a type of the print medium being transported by the sheet conveyance unit. The print medium may have, for example, one or more wireless tags thereon or therein.

20 Claims, 7 Drawing Sheets

IMAGE FORMING APPARATUS

CROSS-REFERENCE TO RELATED APPLICATIONS

This application is a continuation of U.S. patent application Ser. No. 17/241,807, filed on Apr. 27, 2021, which is based upon and claims the benefit of priority from Japanese Patent Application No. 2020-136943, filed Aug. 14, 2020, the entire contents of each of which are incorporated herein by reference.

FIELD

Embodiments of the present disclosure relate to an image forming apparatus.

BACKGROUND

Conventionally, an image forming apparatus capable of writing tag information to an RFID tag attached to a print medium is known. In general, writing of tag information occurs during the conveyance of the print medium within the image forming apparatus.

In such a case, the image forming apparatus emits radio waves to a predetermined emission region on the path through which the print medium passes during conveyance, and writes tag information to an RFID tag that has been attached to the print medium. However, the emission region typically includes a high gain region for which the gain of the antenna of the RFID tag is higher than a desired gain and a low gain region where the gain is lower than a desired gain. Therefore, the image forming apparatus may sometimes fail to write the tag information when the print medium passes through the emission region. This problem could be solved by increasing the number of antennas that radiate radio waves. However, it is usually not preferable to increase the number of antennas because the manufacturing cost of the image forming apparatus increases.

DETAILED DESCRIPTION

Figure 1:
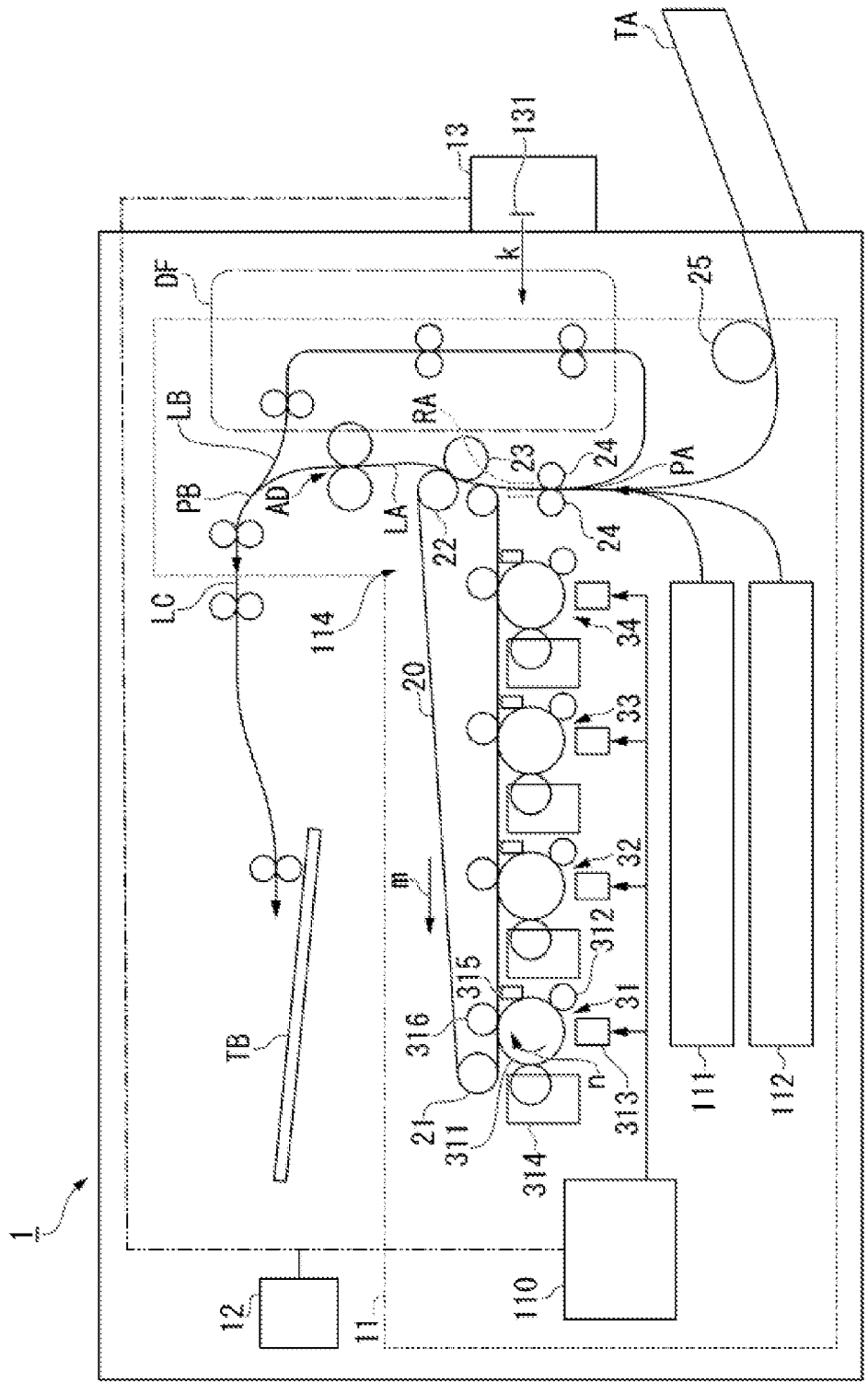
FIG. 1 depicts a configuration of an image forming apparatus of an embodiment.

In general, according to one embodiment, an image forming apparatus includes a sheet conveyance unit configured to transport a print medium along a conveyance path, an antenna configured to emit radio waves towards a predetermined portion of the conveyance path, and a controller. The controller is configured to control the antenna to emit the radio waves towards the predetermined portion with a polarization direction set according to a type of the print medium being transported by the sheet conveyance unit.

An image forming apparatus according to an example embodiment will be described with reference to the drawings. In the drawings, the same components are denoted by the same reference numerals. An image forming apparatus 1 will be described as one example of an image forming apparatus according to the present disclosure.

(Configuration of Image Forming Apparatus)

The configuration of an image forming apparatus will be described with reference to FIG. 1. FIG. 1 is a diagram illustrating an example of a configuration of an image forming apparatus 1 according to an embodiment.

The image forming apparatus 1 forms an image on a print medium, and is, for example, a multifunction peripheral, a copier, a printer, or the like. In this context, the print medium is any medium on which the image forming apparatus 1 can perform processing for image formation or the like. For example, the print medium can be printing paper, label paper, a plastic film, or the like.

The image forming apparatus 1 specifies the type of a print medium to be subjected to processing desired by a user according to an operation received from the user. The print medium can be classified according to size, thickness, material, and/or the presence or absence of a wireless tag. A print medium having a wireless tag is a print medium to which one or more wireless tags have been attached. A print medium having no wireless tag is simply a print medium to which no wireless tag has been attached. A print medium having the wireless tag can be further classified according to the position(s) of the one or more attached wireless tags. The position of at which a wireless tag is attached can be represented by, for example, information indicating an area occupied by the wireless tag from among areas on at least one of a front surface or a back surface of the print medium. The position may be represented by other information such as coordinates or designations capable of indicating the position of the wireless tag on the print medium.

The wireless tag is, for example, an RFID (Radio Frequency Identification) tag, but is not limited thereto. The wireless tag generally has a shape having a long axis and a short axis and is affixed on a front surface or a rear surface of the print medium. When the wavelengths of radio waves are the same, the radio tag interacts more strongly with a polarized wave whose polarization plane is parallel (or more substantially so) to the long axis than with a polarized wave whose polarization plane is perpendicular (or more substantially so) to the long axis. In this context, a strong interaction means that the radio wave is less likely to pass through the wireless tag without result and the radio wave reaching the wireless tag is thus more likely to be absorbed and/or reflected (returned) by the wireless tag.

The image forming apparatus 1 forms an image on a print medium of a type specified in advance according to an operation received from a user. For example, when a first print medium PRA is selected by the user, the image forming apparatus 1 forms an image appropriate for the first print medium PRA type. In this example, the first print medium PRA type is A4-size paper of normal (plain) thickness having two wireless tags. When a second print medium PRB type is selected, the image forming apparatus 1 forms an image appropriate for the second print medium PRB type. In this example, the second print medium PRB type is a thick paper of A4 size and has no wireless tags.

The image forming apparatus 1 writes tag information to each of the one or more wireless tags attached to a print medium according to an operation received from a user. For example, when the first print medium PRA type is specified, the image forming apparatus 1 writes tag information to each of the two wireless tags attached to the first print medium PRA.

In order to write the tag information to the wireless tag(s), the image forming apparatus 1 includes an antenna that radiates radio waves to a predetermined radiation region RA on a path through which the print medium passes during conveyance through the image forming apparatus 1.

The image forming apparatus 1 causes the antenna to radiate polarized waves to the radiation region RA. However, the radiation region RA includes a high gain area, where the gain of the antenna of the wireless tag attached to the print medium is higher than a desired gain, and a low gain area, where the gain of the antenna of the wireless tag is lower than the desired gain.

Figure 2:
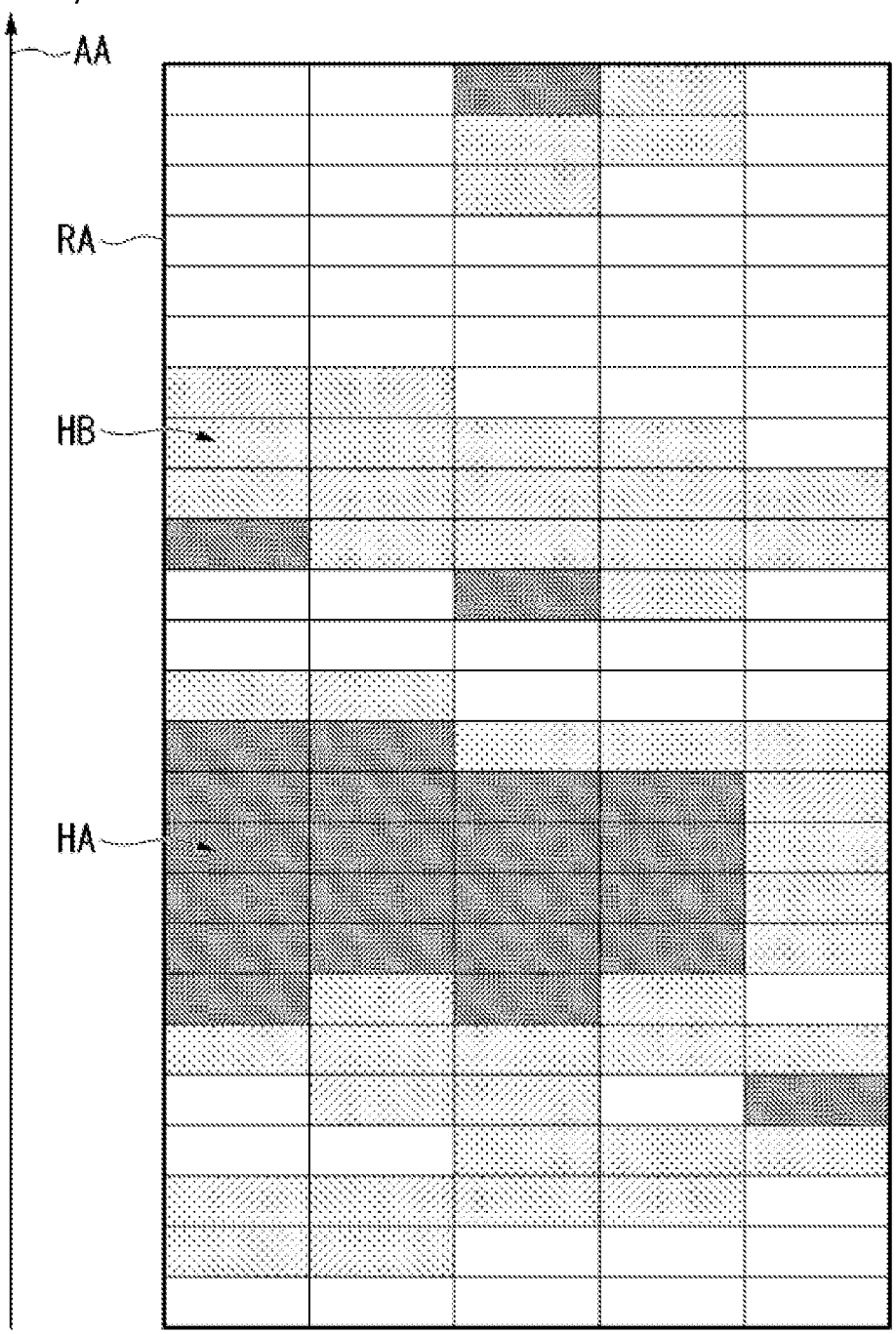
FIG. 2 is a diagram showing an example of a distribution high gain regions and low gain regions in a radiation region when an image forming apparatus radiates a horizontally polarized wave to the radiation region.
Figure 3:
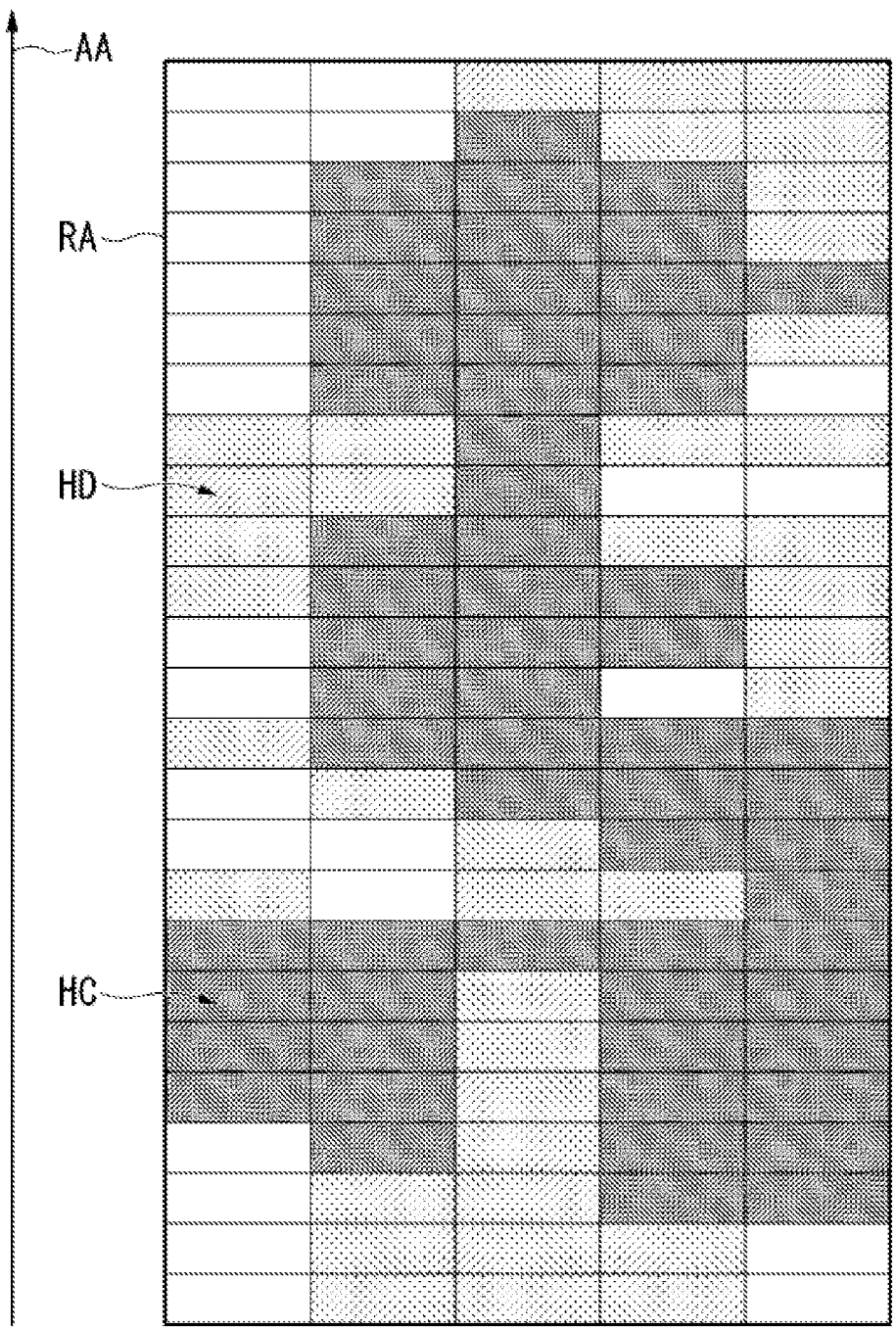
FIG. 3 is a diagram showing an example of a distribution of high gain regions and low gain regions in a radiation region when an image forming apparatus radiates a vertically polarized wave to the radiation region.

As shown in FIGS. 2 and 3, the distribution of the high gain regions and the low gain regions in the radiation region RA changes according to the polarization direction of the polarized wave radiated by the image forming apparatus 1.

FIG. 2 is a diagram illustrating an example distribution of high gain regions and low gain regions in the radiation region RA when the image forming apparatus 1 radiates a horizontally polarized wave to the radiation region RA. In FIG. 2, a region HA in the radiation region RA is an example of a high gain region. In the radiation region RA, a region hatched in the same manner as the region HA also indicates an example of the high gain region in this case. In FIG. 2, a region HB in the radiation region RA is an example of a low gain region in this case. In the radiation region RA, a region hatched in the same manner as the region HB also indicates an example of the low gain region. The direction indicated by an arrow AA illustrated in FIG. 2 indicates a forward conveyance direction when the print medium passes through the radiation region RA, that is, the conveyance direction of the print medium through the radiation region RA. As shown in FIG. 2, the high gain regions are distributed so as to generally extend in the direction orthogonal to the conveyance direction of the print medium.

FIG. 3 is a diagram illustrating an example of a distribution of high gain regions and low gain regions in the radiation region RA when the image forming apparatus 1 radiates a vertically polarized wave to the radiation region RA. In FIG. 3, the region HC within the radiation region RA shows an example of the high gain region. In the radiation region RA, a region hatched in the same manner as the region HC also indicates an example of the high gain region. In FIG. 3, a region HD in the radiation region RA is an example of a low gain region. In the radiation region RA, a region hatched in the same manner as the region HD also indicates an example of the low gain region. As shown in FIG. 3, the high gain region in this case is distributed so as to extend generally along the conveyance direction of the print medium.

As shown in FIGS. 2 and 3, the distribution of the high gain regions and the low gain regions in the radiation region RA changes according to the polarization direction of the wave radiated by the image forming apparatus 1.

Figure 4:
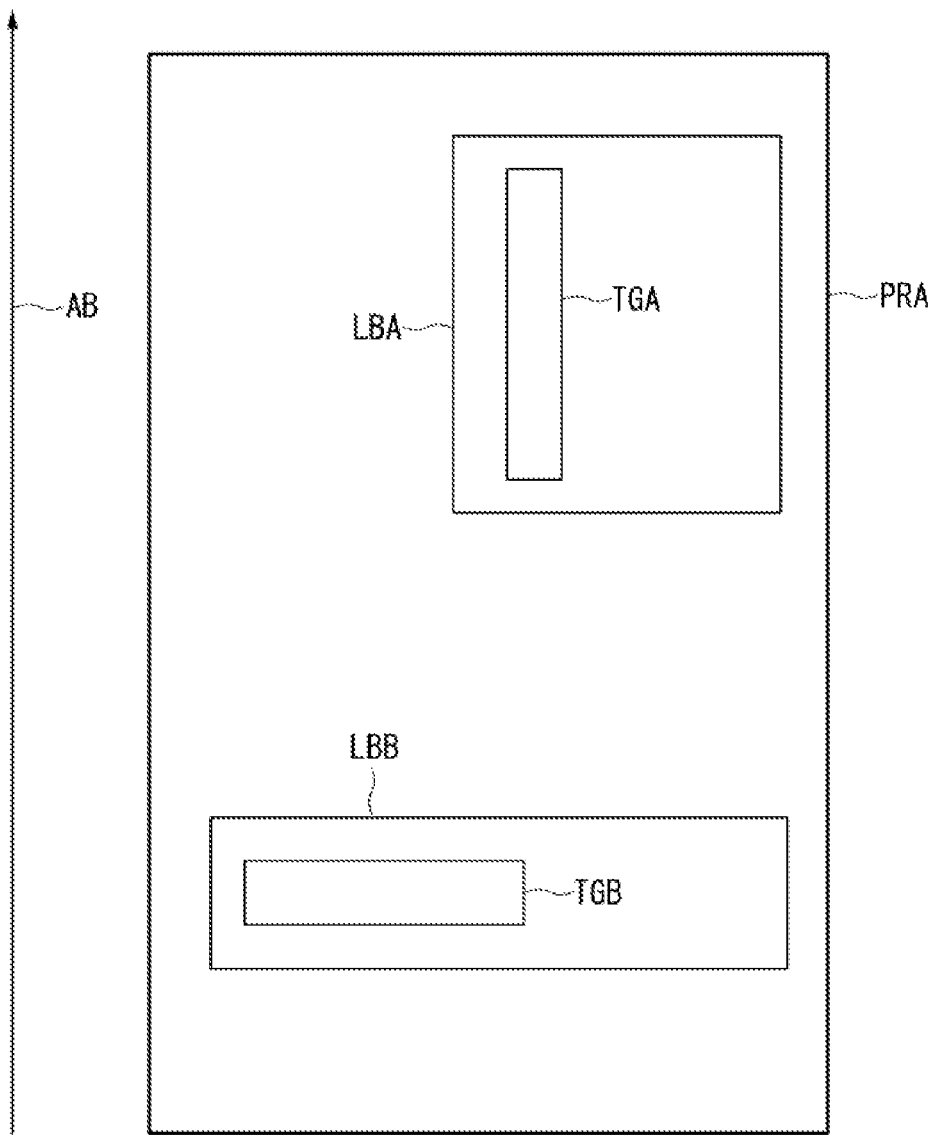
FIG. 4 is a diagram of positions on a surface of a print medium for two wireless tags.

The position where the wireless tag is attached on the print medium can be different for each type of print medium. For example, two wireless tags attached to a first type print medium can be attached to the surface of the print medium as shown in FIG. 4. FIG. 4 indicates a conveyance direction in which the first print medium PRA is intended to be conveyed in the image forming apparatus 1. As shown in FIG. 4, two labels (LBA, LBB) are attached to a first print medium PRA. One of the two labels is the label LBA. The other of the two labels is a label LBB.

The label LBA is, for example, an article label for identifying an article to be stored in a returnable container to which the first print medium PRA will be ultimately attached. In other examples, the label LBA may be another label type instead of an article label. A wireless tag TGA is attached to the label LBA. The shape of the wireless tag TGA shown in FIG. 4 is a rectangular shape, but, in other examples, may be another shape having a long axis and a short axis. The label LBA is attached to the first print medium PRA such that the long axis of the wireless tag TGA is parallel or aligned with respect to the conveyance direction.

The label LBB is, for example, a returnable container label for identifying a returnable container to which the first print medium PRA will be ultimately attached. In other examples, the label LBB may be another label type instead of a returnable container label. A wireless tag TGB is attached to the label LBB. The shape of the wireless tag TGB is a rectangular shape, but, in other examples, the shape may be another shape having a long axis and a short axis. The label LBB is attached to the first print medium PRA such that the longitudinal direction of the wireless tag TGB is perpendicular (or substantially so) to the conveyance direction.

When the tag information is to be written to the wireless tag TGA, the image forming apparatus 1 can reduce the possibility of writing failure by emitting a vertically polarized wave. This is because, as described above, the radio tag interacts more strongly with a polarized wave whose polarization plane is parallel to its long axis than with a polarized wave whose polarization plane is perpendicular to its long axis. On the other hand, when the tag information is written to the wireless tag TGB, the image forming apparatus 1 uses a horizontally polarized wave to reduce the possibility of writing failure. From this, it can be understood that by changing the polarization direction of the radiated wave in accordance with the type of the print medium, it is possible to reduce failures in writing the tag information to the wireless tag(s).

The image forming apparatus 1 identifies the type of the print medium and changes the polarization direction of the polarized wave radiated from the antenna based on the polarization direction information associated with the type of the print medium. The polarization direction information indicates the polarization direction of radio waves to be used in writing tag information. As such, the image forming apparatus 1 can reduce the failures in writing the tag information to the wireless tag(s). As an example, a case where the image forming apparatus 1 changes the polarization direction of the linearly polarized wave according to the type of the print medium having the wireless tag will be described. That is, in this example, the image forming apparatus 1 switches the polarization to be radiated between horizontal polarization and vertical polarization according to the print medium type. The image forming apparatus 1 may also be configured to change the polarization direction of a circularly polarized wave according to the print medium type in some examples. In other examples, the image forming apparatus 1 may be configured to change the polarization direction of the radio wave by switching between a linear polarized wave and circularly polarized wave according to the print medium type. In general, the image forming apparatus 1 may be configured to change the polarization direction of the radio wave in various manners according to the print medium type.

The polarization direction information may be any information as long as it can indicate the polarization direction of the radio wave to be used with the corresponding print medium type. For example, the certain polarization direction information may be a code for causing the control unit 110 to perform a process for matching the polarization direction of the polarized wave radiated from the antenna 131 with the polarization direction indicated by the polarization direction information. In such a case, the control unit 110 matches the polarization direction of the polarized wave radiated from the antenna 131 with the polarization direction indicated by the polarization direction information based on the code.

For example, certain polarization direction information may indicate a first feeding point or a second feeding point of the antenna 131. In this case, the control unit 110 matches the polarization direction of the polarized wave radiated from the antenna 131 with the polarization direction indicated by the polarization direction information.

For example, certain polarization direction information may be an ID (Identification) value associated with the polarization direction. In this case, the control unit 110 stores information in which the ID value and the polarization direction are associated with each other, and causes the polarization direction of the polarized wave radiated from the antenna 131 to be the polarization direction associated with the ID value.

For example, certain polarization direction information may be tag position information associated with the polarization direction. The tag position information in this context thus indicates a position or positions at which one or more wireless tags are attached to a print medium. In this case, the control unit 110 stores information in which the tag position information and the polarization direction are associated with each other, and causes the polarization direction of the polarized wave radiated from the antenna 131 to match the polarization direction associated with the tag position information.

The image forming apparatus 1 includes a printer unit 11, a control panel 12, a wireless tag communication device 13, a manual feed tray TA, and a sheet discharge tray TB. The image forming apparatus 1 may include other members, components, devices, and the like in addition to the printer unit 11, the control panel 12, the wireless tag communication device 13, the manual feed tray TA, and the sheet discharge tray TB.

The printer unit 11 includes a control unit 110, a paper feed cassette 111, a paper feed cassette 112, and an image forming unit 114.

The control unit 110 controls the overall operations of the image forming apparatus 1. In other words, the control unit 110 controls each of the printer unit 11, the control panel 12, the wireless tag communication device 13, and the image forming unit 114.

The paper feed cassette 111 stores print media of a first type selectable by a user. As an example, a case where the first print medium PRA is stored in the paper feed cassette 111 will be described.

The paper feed cassette 112 stores print media of a second type selectable by a user. As an example, a case where the second print medium PRB is stored in the paper feed cassette 112 will be described.

The control panel 12 includes an operation receiving unit and a display unit.

The operation receiving unit receives an input operation from a user. The operation receiving unit comprises an input device, such as a touch pad, an input key, or the like. The operation receiving unit outputs information to the control unit 110 corresponding to the input operation received from the user.

The display unit displays an image corresponding to an input operation received via the operation receiving unit. The display unit is an image display device, and is, for example, a liquid crystal display, an organic EL (Electro Luminescence) display, or the like. The display unit may be configured integrally with the operation receiving unit as a touch panel.

The image forming unit 114 conveys a print medium and forms an image on the print medium corresponding to image data acquired from the control unit 110. The image forming unit is under the control of the control unit 110. For convenience of description, forming an image on a print medium is referred to as printing.

The wireless tag communication device 13 includes an antenna 131 that radiates radio waves to a predetermined radiation region RA on a conveyance path through which a print medium passes when conveyed by the image forming unit 114.

The antenna 131 is, for example, a single antenna that radiates radio waves to the radiation region RA. In general, a single antenna is preferable for an image forming apparatus 1 to reduce manufacturing cost as compared with a case where the antenna 131 includes a plurality of antennas. That is, when a single antenna is provided as the antenna 131, the image forming apparatus 1 may still reduce tag writing failures, but without the increased manufacturing costs associated with inclusion of a plurality of antennas. However, in some embodiments antenna 131 may include a plurality of antennas and benefits may still be associated with reduction in writing failures and/or reduced manufacturing costs by use of fewer total antennas that might otherwise be required.

The antenna 131 has two feeding points: a first feeding point and a second feeding point. The antenna 131 radiates a first polarized wave when power is supplied to the first feeding point. When power is supplied to the second feeding point, the antenna 131 radiates a second polarized wave. In some examples, the antenna 131 may have configured to have only one feeding point. In other examples, antenna 131 may have three or more feeding points. The direction indicated by the arrow k in FIG. 1 is an example of the direction in which the antenna 131 radiates the first polarized wave or the second polarized wave.

The first polarized wave and the second polarized have polarization directions different from each other. As an example, the case where the first polarized wave is a vertically polarized wave and the second polarized wave is a horizontally polarized wave will be described. In this example, both the first polarized wave and the second polarized wave are linearly polarized waves. That is, in this example, the antenna 131 radiates only a linearly polarized wave to the radiation region RA. In some examples, at least one of the first polarized wave and the second polarized wave may be another type of polarized wave besides linearly polarized waves, such as a circularly polarized wave. However, when the first polarized wave and the second polarized wave are linearly polarized waves, the image forming apparatus 1 can more locally radiate the polarized waves from the antenna 131. As a result, it is possible to reduce the possibility that the image forming apparatus 1 conflicts with a problematic radio wave band of the different countries in which such a device might be operated.

The wireless tag communication device 13 causes the antenna 131 to radiate one of the first polarized wave or the second polarized wave under the control of the control unit 110. Thus, the wireless tag communication device 13 can write the tag information to one or more wireless tags attached to the print medium. The method of writing the tag information to the wireless tag may be any method without limitation. Therefore, the details of the method of writing the tag information to a wireless tag will not be described.

(Configuration of Image Forming Unit)

The image forming unit 114 includes an intermediate transfer belt 20. The image forming unit 114 includes a driven roller 21, a backup roller 22, a secondary transfer roller 23, two registration rollers 24, and a manual feed roller 25. The image forming unit 114 includes an image forming station 31, an image forming station 32, an image forming station 33, and an image forming station 34. The image forming unit 114 also includes a fixing device AD and a duplex printing device DF.

The intermediate transfer belt 20 is a belt on which toner images are initially transferred from the four image forming stations (31, 32, 33, 34). The intermediate transfer belt 20 is supported by driven roller 21, backup roller 22, and the like. The intermediate transfer belt 20 rotates in a direction indicated by an arrow m in FIG. 1. More specifically, the image forming unit 114 rotates the intermediate transfer belt 20 in this direction by a motor under the control of the control unit 110.

The image forming station 31 is for forming a Y (yellow) image. The image forming station 32 is for forming an M (magenta) image. The image forming station 33 is for forming a C (cyan) image. The image forming station 34 for forming a K (black) image. In the image forming unit 114, this set of four image forming stations (31, 32, 33, 34) are placed below the intermediate transfer belt 20 and spaced sequentially along the direction of rotation of the intermediate transfer belt 20.

The image forming station 31 includes a photoconductor drum 311, an electrostatic charger 312, an exposure scanning head 313, a developing device 314, a photoconductor cleaner 315, and a primary transfer roller 316. In the image forming station 31, the electrostatic charger 312, the exposure scanning head 313, the developing device 314, the photoconductor cleaner 315, and the primary transfer roller 316 are disposed around the photoconductor drum 311, which rotates in a direction indicated by an arrow n in FIG. 1. The primary transfer roller 316 faces the photoconductor drum 311 via the intermediate transfer belt 20.

The configurations of the image forming station 32, the image forming station 33, and the image forming station 34 are similar to the configuration of the image forming station 31. Therefore, further explanation of the configurations of the image forming station 32, the image forming station 33, and the image forming station 34 will be omitted.

The secondary transfer roller 23 faces the backup roller 22 via the intermediate transfer belt 20. The secondary transfer roller 23 transfers the toner image from the intermediate transfer belt 20 to a print medium passing between the secondary transfer roller 23 and the backup roller 22.

Two registration rollers 24 convey the print medium taken out from any of the paper feed cassette 111, the paper feed cassette 112, and the manual feed tray TA by a conveyance mechanism to the secondary transfer roller 23.

The manual feed roller 25 takes out a print medium from the manual feed tray TA and conveys this print medium to the two registration rollers 24.

The fixing device AD fixes the toner image to the print medium after the toner image is secondarily transferred by the secondary transfer roller 23. More specifically, the fixing device AD fixes the toner image secondarily transferred onto the print medium onto the print medium while conveying the print medium by rollers. Thus, an image is formed on the print medium.

The duplex printing device DF is a device that conveys the print medium back to the registration rollers 24 from the fixing device AD for double-sided printing after an image has been formed on the front surface of the print medium. AD.

(Operation of Image Forming Unit)

First, the operation of the four image forming stations 31, 32, 33, 34 will be described by taking the operation of the image forming station 31 as a representative example.

In the image forming station 31, the photoconductor drum 311 is charged by the electrostatic charger 312 and then selectively exposed by the exposure scanning head 313. Thus, the image forming station 31 forms an electrostatic latent image on the photoconductor drum 311. Thereafter, the image forming station 31 causes the developing device 314 to develop the electrostatic latent image on the photoconductor drum 311. The developing device 314 develops the electrostatic latent image as a toner image on the photoconductor drum 311 using a two-component developer comprising a toner and carrier. The primary transfer roller 316 transfers the toner image formed on the photoconductor drum 311 to the intermediate transfer belt 20. After this transfer (referred to as a primary transfer), the photoconductor cleaner 315 removes toner still remaining on the photoconductor drum 311.

Each of the image forming station 31, the image forming station 32, the image forming station 33, and the image forming station 34 forms a different color toner image on the intermediate transfer belt 20. A full color toner image can be formed by sequentially superimposing the different toner images of Y (yellow), M (magenta), C (cyan), and K (black) one on the other.

The secondary transfer roller 23 collectively transfers (referred to as a secondary transfer) the superimposed color toner images on the intermediate transfer belt 20 to the print medium as the print medium passes between the secondary transfer roller 23 and the intermediate transfer belt 20. In the following description, a "toner image" may be either a full color toner image or a toner image of only one color. In some examples, the toner image may be formed using a decolorable toner.

Next, among the operations of the image forming unit 114, the operation of conveying a print medium will be described.

The print medium (taken out from each of the paper feed cassette 111, the paper feed cassette 112, or the manual feed tray TA) is abutted against the nip formed between the two registration rollers 24 by a conveyance mechanism. As a result, the front end of the print medium is aligned (sheet skew/angle is corrected). Thereafter, the two registration rollers 24 convey the print medium to pass between the secondary transfer roller 23 and the intermediate transfer belt 20 in accordance with the timing at which the image forming unit 114 is required to transfer the toner image onto the print medium. The various conveyance paths from each of the paper feed cassette 111, the paper feed cassette 112, and the manual feed tray TA to the two registration rollers 24 merge at the merging portion PA shown in FIG. 1.

In the image forming unit 114, a conveyance path LA, a conveyance path LB, and a conveyance path LC are provided. These three conveyance paths LA, LB, LC are formed by the two registration rollers 24, the fixing device AD, and a plurality of rollers in the duplex printing device DF. The conveyance path LA is from the merging portion PA to the branching portion PB illustrated in FIG. 1. The conveyance path LB passes through the inside of the duplex printing apparatus DF, and is a conveyance path from the branching portion PB back to the merging portion PA. The conveyance path LC is from the branching portion PB to the sheet discharge tray TB.

The registration rollers 24 start rotating in accordance with the position of the toner image on the rotating intermediate transfer belt 20, and move the print medium to the position of the secondary transfer roller 23 to meet the toner image. As a result, the toner image formed on the intermediate transfer belt 20 is transferred onto the print medium by the secondary transfer roller 23 at an appropriate position. After the toner image is transferred to the print medium, the secondary transfer roller 23 conveys the print medium along the conveyance path LA to the fixing device AD. The fixing device AD fixes the toner image to the print medium. The fixing device AD then conveys the print medium to the conveyance path LC. The print medium conveyed to the conveyance path LC can be discharged by a discharge roller or the like.

In the case of double-sided printing, after an image is formed on the front surface and the entire print medium passes through the branching portion PB, a switchback roller or the like conveys the print medium to the conveyance path LB. As a result, the front surface and the back surface of the print medium are reversed. Thereafter, rollers in the duplex printing apparatus DF convey the print medium along the conveyance path LB back to the nip between the two registration rollers 24. Then, the print medium (whose front surface and back surface are now reversed) is conveyed along the conveyance path LA via the two registration rollers 24, and another toner image can be fixed by the fixing device AD. Thus, an image is formed on the back surface of the print medium. The fixing device AD conveys the print medium having an image formed on the back surface thereof to the conveyance path LC and discharges the print medium.

As described above, the secondary transfer roller 23, the two registration rollers 24, the fixing device AD, and various rollers in the duplex printing device DF constitute a conveyance path that conveys the print medium in the image forming apparatus 1.

(Position of Radiation Region on Conveyance Path)

The position of the radiation region RA on the conveyance path LA will be described. The proportion of high gain regions in the radiation region RA may change depending on specific position of the radiation region RA along the conveyance path LA.

In the example illustrated in FIG. 1, the radiation region RA is located on the conveyance path LA upstream of the two registration rollers 24. This is because if the radiation region RA is located on the downstream side of the two registration rollers 24, the proportion of the high gain regions in the radiation region RA tends to be smaller in view of the relative positioning of the antenna 131. That is, by setting the radiation region RA on the upstream side of the two registration rollers 24 along the conveyance path LA, the proportion of the high gain regions in the radiation region RA can be increased. As a result, the image forming apparatus 1 can more surely avoid tag writing failures.

In the example illustrated in FIG. 1, the radiation region RA is located at position higher than the manual feed roller 25. The manual feed tray TA is often positioned above the sheet feed cassette 111 and the paper feed cassette 112. Therefore, a print medium placed on the manual feed tray TA may be exposed to radio waves radiated from the antenna 131. If a print medium with a wireless tag is placed on the manual feed tray TA, then unintended writing of tag information to the wireless tag may be performed. When an area located above the manual feed roller is used for the radiation region RA, the image forming apparatus 1 can avoid unintended writing to the wireless tag.

The radiation region RA may be located downstream of the two registration rollers 24 on the conveyance path LA. The radiation region RA may be a region where part or all of the two registration rollers 24 overlap when the radiation conveyance path LA is viewed in the direction of the radiation direction. In this case, the radiation region RA may be located below the manual feed roller 25. In this case, the radiation region RA may partially or entirely overlap the manual feed roller 25.

(Configuration of Control Unit)

Next, a configuration of the control unit 110 will be described with reference to FIG. 5.

Figure 5:
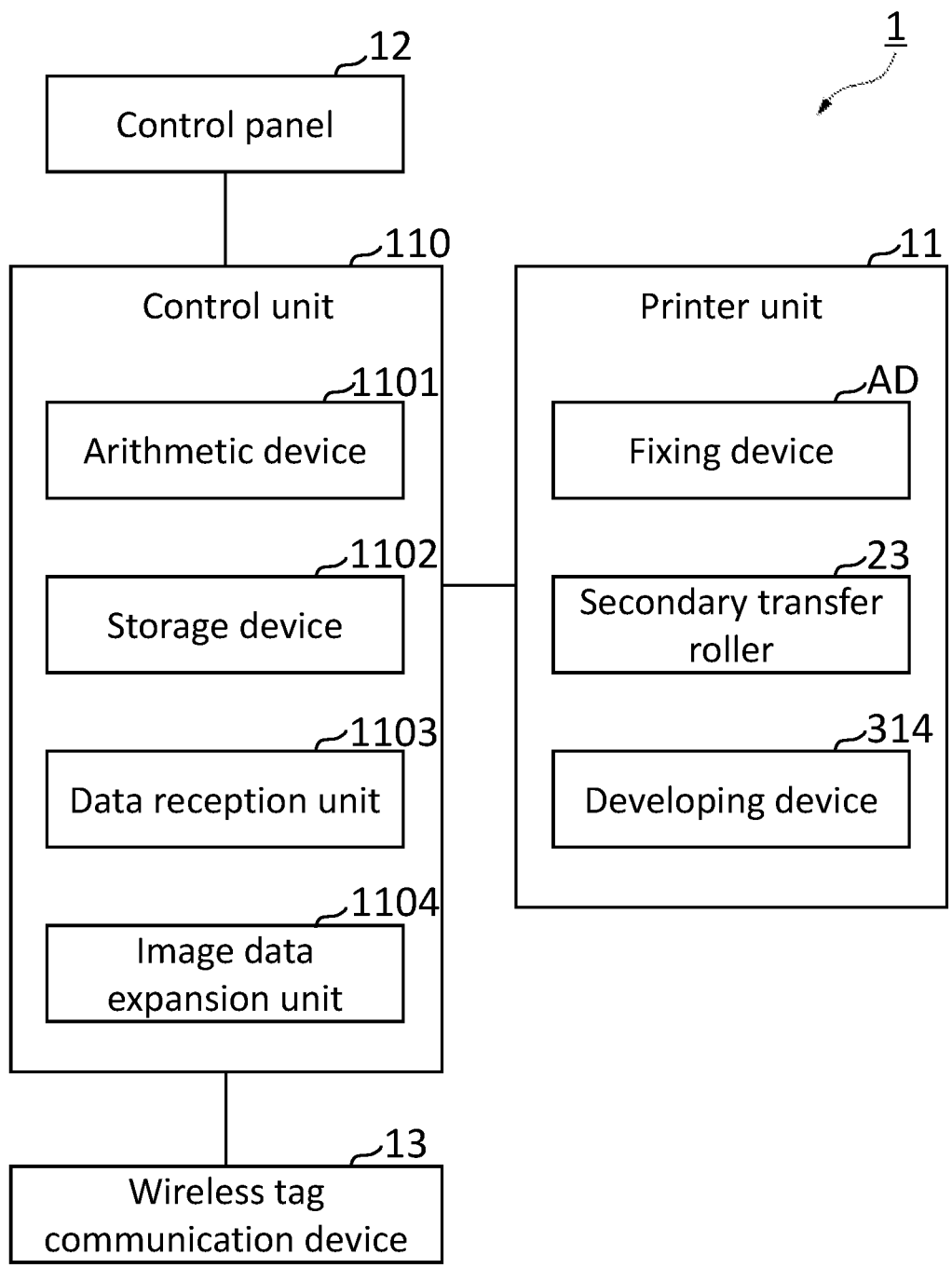
FIG. 5 depicts aspects of a control unit.

As shown in FIG. 5, the control unit 110 is communicably connected to the printer unit 11, the control panel 12, and the wireless tag communication device 13. The control unit 110 includes an arithmetic device 1101, a storage device 1102, a data reception unit 1103, and an image data expansion unit 1104.

The arithmetic device 1101 is, for example, a CPU (Central Processing Unit) or an ASIC (Application Specific Integrated Circuit). The arithmetic unit 1101 controls the printer unit 11, the control panel 12, and the wireless tag communication device 13 in accordance with an image processing program stored in the storage device 1102. For example, the control unit 110 outputs conveyance start information indicating conveyance of the print medium has started.

The storage device 1102 is ROM (Read Only Memory), RAM (Random Access Memory), a HDD (Hard Disk Drive), a SSD (Solid State Drive), or the like. The storage device 1102 may be separate from the controller 110.

The data reception unit 1103 receives print information (for example, information described in a page description language) from a host such as a PC (Personal Computer) indicating the image to be printed, and stores the received print information in the storage device 1102.

The image data expansion unit 1104 determines print conditions from the print data stored in the storage device 1102, converts the print data into data that can be printed by the printer unit 11 (for example, raster data), and stores this data in the storage device 1102.

(Process by Which the Image Forming Apparatus Writes Tag Information to Wireless Tag)

Figure 6:
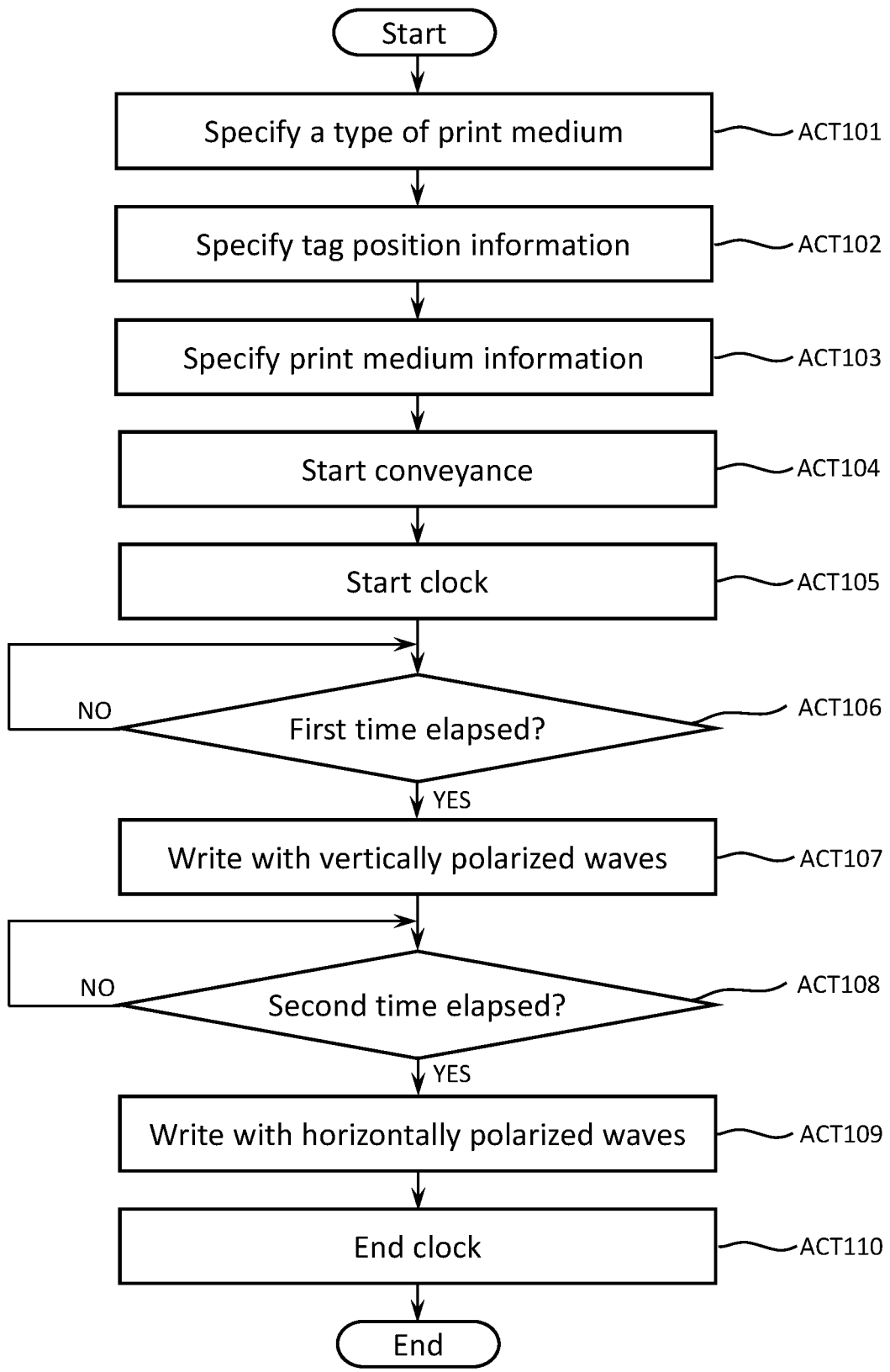
FIG. 6 flowchart of processing by which an image forming apparatus writes tag information to a wireless tag.

With reference to FIG. 6, a process by which the image forming apparatus 1 writes tag information to a wireless tag will be described. FIG. 6 is a flowchart of processing in which the image forming apparatus 1 writes tag information to a wireless tag.

As one example, a case where the polarization direction information is tag position information will be described. The processing corresponding to the flowchart illustrated in FIG. 6 will be described assuming that the following processes (1) to (5) are performed before the start of the flowchart process. The pre-processing start time is before the ACT101 processing shown in FIG. 6 is performed.

(1) The image forming apparatus 1 receives image data of an image to be printed on a print medium. (2) The image forming apparatus 1 receives an input operation for selecting the type of print medium via the control panel 12. (3) The image forming apparatus 1 receives an input operation to start writing tag information to the wireless tag. (4) Tag position information is stored in advance in the storage device 1102 for each type of print medium. (5) Print medium information is stored in advance in the storage device 1102 for each type of print medium.

The print medium information in this context relates to the print medium types, and is, for example, information indicating characteristics of the print medium such as the size of the print medium, the thickness of the print medium, and the like. The print medium information may also include tag position information. In other words, the print medium information may include polarization direction information.

The control unit 110 specifies the type of print medium that has been selected by the user in advance via the control panel 12 (ACT101). As an example, the type of print medium specified in ACT101 is the first print medium PRA.

Based on the type of print medium specified in ACT101, the control unit 110 specifies tag position information for the one or more wireless tags attached to the print medium (ACT102). At this time, the control unit 110 identifies specific tag position information according to the selected print medium type from among a plurality of pieces of tag position information that has have been previously stored in the storage device 1102. In this example, the type of print medium is the first print medium PRA type. In this case, the control unit 110 selects tag position information indicating the position of the wireless tag TGA and the wireless tag TGB on the first print medium PRA from the plurality of pieces of tag position information stored in the storage device 1102.

The tag position information indicating the position of the wireless tag TGA may be any information as long as it is capable of indicating the position of the wireless tag TGA. The tag position information may be, for example, position coordinates on the surface of the first print medium PRA. The tag position information may be, for example, a code associated with the position based on a predetermined rule.

Likewise, the tag position information indicating the position of the wireless tag TGB may be any information as long as it is capable of indicating the position of the wireless tag TGB. The tag position information may be, position coordinates on the surface of the first print medium PRA or a code associated with the position based on a predetermined rule.

Based on the type of print medium specified in ACT101, the control unit 110 identifies print medium information related to the type of print medium from among a plurality of pieces of print medium information stored in advance in the storage device 1102 (ACT103). In the present example, the control unit 110 specifies the print medium information related to the first print medium PRA type. In some examples, the processing of ACT103 may be performed by the control unit 110 in parallel with the processing of the ACT102, or may be performed by the control unit 110 before the processing of the ACT102.

The control unit 110 sets (specifies) parameters related to conveyance of the print medium based on the print medium information specified in ACT103. In this context, a parameter to be set is a conveyance speed or the like. The control unit 110 controls the image forming unit 114 based on the set parameters, and starts conveyance of the print medium accordingly (ACT104). In this example, the set parameter is set to a value appropriate for conveyance of the first print medium PRA type.

The control unit 110 begins measuring the elapsed time (e.g., starts a clock or timer) from the start of conveyance (ACT105). The control unit 110 specifies the timing at which the conveyance of the print medium is started as the time at which the signal for starting the conveyance of the print medium is output. The control unit 110 may be configured to specify the time at which conveyance of the print medium is started by other methods. For example, the controller 110 may be configured to specify the start time based on an output from one or more position sensors that detect the position of the print medium on the conveyance path LA. For example, the control unit 110 may be configured to start the elapsed timing based on a combination of the time at which the signal is output as well as outputs from one or more position sensors.

The control unit 110 waits until a predetermined first time elapses after the start (in ACT104) of the conveyance of the print medium based on the elapsed time when the clock is started in ACT105 (ACT106). In this context, the first time is the expected time required from the start of the conveyance until the wireless tag TGA begins to pass through the radiation region RA. The control unit 110 sets the first time length based on the type of the print medium specified in ACT101 and the first correspondence information in the storage device 1102. The first correspondence information is information in which at least a part of the parameters set in ACT103 are associated with the first time for each type of print medium. For example, the first correspondence information is information in which the conveyance speed value and a first time length are associated with each other for each type of print medium. In some examples, the control unit 110 may be configured to calculate the first time length based on the type of print medium and the first correspondence information. In this case, the control unit 110 uses, for example, the known distance over which the print medium is to be conveyed, or the like, to calculate the first time. In other examples, the control unit 110 may be configured to detect that the RFID tag TGA has started to pass through the radiation region RA based on the output from one or more position sensors. In such a case, in ACT106, the control unit 110 determines whether or not it is detected that the wireless tag TGA has started to pass through the radiation region RA. In some examples, the control unit 110 may be configured to detect that the wireless tag TGA has started to pass through the radiation region RA based on the elapsed time and the output from one or more position sensors. Also in such a case, in ACT106, the control unit 110 determines whether or not it is detected that the wireless tag TGA has started to pass through the radiation region RA.

When it is determined that the first time has elapsed since the start of the conveyance of the print medium (ACT106; YES), the control unit 110 attempts to write the tag information to the wireless tag TGA (ACT107). More specifically, the control unit 110 specifies the polarization direction associated with the tag position information based on the tag position information indicating the position of the wireless tag TGA in ACT107. This tag position information can be one of two pieces of tag position information specified in ACT102. The control unit 110 matches the polarization direction of the polarized wave radiated from the antenna 131 with the specified polarization direction. The polarization direction specified by the control unit 110 is the vertical direction in this example. That is, in ACT107, the control unit 110 causes the antenna 131 to radiate the vertically polarized wave based on the tag position information indicating the position of the RFID tag TGA, and writes the tag information to the RFID tag TGA using the vertically polarized wave.

The control unit 110 next waits until a predetermined second time elapses after the conveyance of the print medium is started based on the elapsed time since the clock start is ACT105 (ACT108). The second time is longer than the first time. The second time is the time from the start of the conveyance until the wireless tag TGB begins to pass through the radiation region RA. In ACT108, the control unit 110 sets the second time length based on the type of print medium specified in ACT101 and the second correspondence information stored in the storage device 1102. In second correspondence information at least some of the parameters set in the ACT103 are associated with the second time for each type of print medium. For example, in the second correspondence information the conveyance speed and the second time are associated with each other for each type of print medium. In some examples, the control unit 110 may be configured to calculate the second time based on the type of print medium and the second correspondence information. In this case, the control unit 110 uses, for example, the distance over which the print medium is to be conveyed to calculate the second time. In some examples, the control unit 110 may be configured to detect when the wireless tag TGB starts to pass through the radiation region RA based on the output from one or more position sensors. In this case, in ACT108, the control unit 110 determines whether or not the wireless tag TGB has been detected starting to pass through the radiation region RA. The control unit 110 may be configured to determine that the wireless tag TGB has started to pass through the radiation region RA using an elapsed time and the output from one or more position sensors.

When it is determined that the second time has elapsed after the conveyance of the print medium was started (ACT108—YES), the control unit 110 attempts to write the tag information to the wireless tag TGB (ACT109). More specifically, the control unit 110 specifies the polarization direction based on the tag position information indicating the position of the wireless tag TGB. This tag position information is the remaining one of the two pieces of tag position information that were specified in ACT102. The control unit 110 matches the polarization direction of the polarized wave radiated emitted from the antenna 131 to the specified polarization direction. Here, the polarization direction specified by the control unit 110 is the horizontal direction. That is, in ACT109, the control unit 110 causes the antenna 131 to radiate a horizontally polarized wave for the wireless tag TGB, and writes the tag information to the wireless tag TGB using the horizontally polarized wave.

The control unit 110 ends the clocking of the elapsed time started in ACT105 (ACT110), and ends the processing of the flowchart illustrated in FIG. 6.

In FIG. 6, in order to clarify the process of writing the tag information to the wireless tag, the description of the process related to the discharge of the first print medium PRA, the process of forming an image on the first print medium PRA, and the like is omitted. If the wireless tag TGA is attached to the first print medium PRA but the wireless tag TGB is not attached to the first print medium PRA, the processing of ACT108 and the processing of ACT109 can be omitted. When the wireless tag TGA is not attached to the first print medium PRA but the wireless tag TGB is attached to the first print medium PRA, the processing of ACT106 and the processing of ACT107 can be omitted.

(Screen by which Image Forming Apparatus Receives Selection of Type of Print Medium from User)

Figure 7:
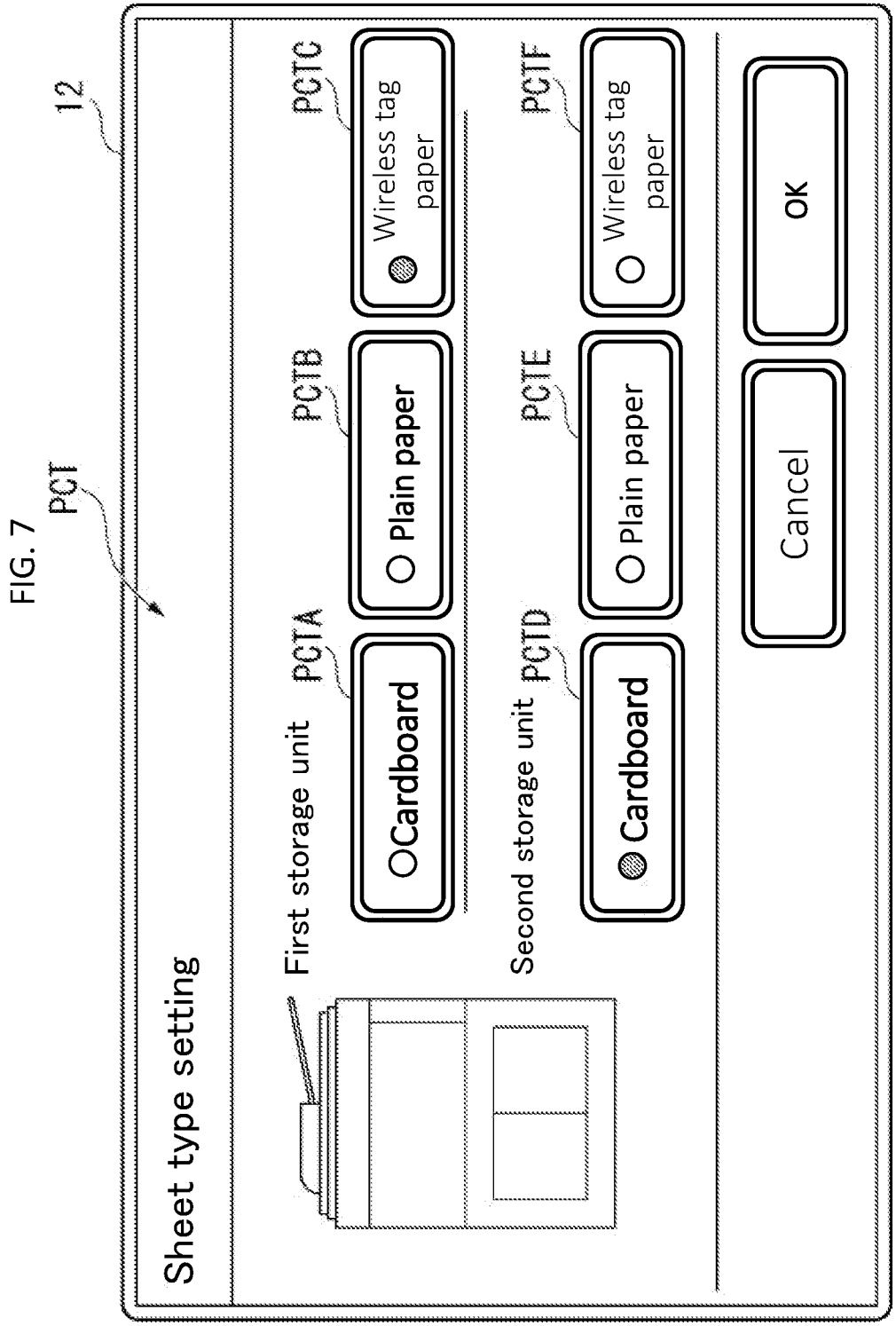
FIG. 7 depicts an operating screen by which an image forming apparatus receives an input operation from a user for selecting the type of print medium.

With reference to FIG. 7, an operation image (e.g., a user interface screen or panel) by which the image forming apparatus 1 receives an input operation for selecting the type of print medium from the user will be described. FIG. 7 depicts an example of an operation image in which the image forming apparatus 1 receives an operation for selecting a type of print medium to be used in the image forming apparatus 1. An operation image PCT illustrated in FIG. 7 is one example of an operation image by which the image forming apparatus 1 receives an input operation for selecting the type of the print medium from the user. The operation image PCT is displayed on the display unit of the control panel 12. In the example illustrated in FIG. 7, the display unit of the control panel 12 is configured as a touch panel. A case will be described in which the image forming apparatus 1 has already received the size of the print medium to be used from an operation image different from the operation image PCT illustrated in FIG. 7.

The label "First storage unit" on the operation image PCT in FIG. 7 is information indicating the associated region(s) and/or button(s) in the operation image PCT are related to the paper feed cassette 111. The label "Second storage unit" on the operation image PCT in FIG. 7 is information indicating associated regions(s) and/or buttons in the operation image PCT are related to the paper feed cassette 112.

The operation image PCT includes a button PCTA, a button PCTB, a button PCTC, a button PCTD, a button PCTE, and a button PCTF.

The buttons PCTA to PCTC are associated with the paper feed cassette 111.

The button PCTA is a button for selecting thick paper as the type of print medium stored in the paper feed cassette 111. When a selection operation, such as a touch operation, is performed on the button PCTA, the control unit 110 selects thick paper as the type of print medium stored in the paper feed cassette 111.

The button PCTB is a button for selecting plain paper as the type of print medium stored in the paper feed cassette 111. When a selection operation is performed on the button PCTB, the control unit 110 selects plain paper as the type of print medium stored in the paper feed cassette 111.

The button PCTC is a button for selecting wireless tag paper as the type of print medium stored in the paper feed cassette 111. When a selection operation is performed on the button PCTC, the control unit 110 selects wireless tag paper as the type of print medium stored in the paper feed cassette 111.

The button PCTD is a button for selecting thick paper as the type of print medium stored in the paper feed cassette 112. When a selection operation is performed on the button PCTD, the control unit 110 selects thick paper as the type of print medium stored in the paper feed cassette 112.

The button PCTE is a button for selecting plain paper as the type of print medium stored in the paper feed cassette 112. When a selection operation is performed on the button PCTE, the control unit 110 selects plain paper as the type of print medium stored in the paper feed cassette 112.

The button PCTF is a button for selecting wireless tag paper as the type of print medium stored in the paper feed cassette 112. When a selection operation is performed on the button PCTF, the control unit 110 selects wireless tag paper as the type of print medium stored in the paper feed cassette 112. In this example, the label "cardboard" refers to, for example, paper having a basis weight greater than 90 g/m$^2$. The label "plain paper" refers to, for example, paper having a basis weight of about 35 to 90 g/m². The label "wireless tag paper" refers to a print medium having a wireless tag thereon or therein.

The image forming apparatus 1 receives an input operation for selecting the type of print medium from the user via the operation image PCT being displayed on the display unit of the control panel 12. Thus, the image forming apparatus 1 can specify the type of print medium as selected by the user in the ACT101 shown in FIG. 6, for example.

First Modification

An image forming apparatus 1 according to a first modification includes a print medium information detection unit that detects print medium information related to a print medium to be printed. The print medium information detection unit comprises, for example, one or more sensors that detect the size of the print medium, the thickness of the print medium, and the like. In the image forming apparatus 1, sensors provided in or integrated with the paper feed cassette 111 and the paper feed cassette 112 may be used as a print medium information detection unit.

In the image forming apparatus 1, a sensor provided near the two registration rollers 24 may be used as the print medium information detection unit. When the print medium information detection unit is provided, the image forming apparatus 1 specifies the type of the print medium based on the print medium information detected by the print medium information detection unit. The image forming apparatus 1 then reads the tag position information associated with the specified type of print medium from the storage device 1102 and 1 sets the polarization direction of the polarized wave radiated from the antenna 131 based on the read tag position information. That is, even in this case, the image forming apparatus 1 can prevent or reduce failures of writing the tag information to the wireless tag.

Second Modification

An image forming apparatus 1 according to the second modification includes a tag position information detection unit that detects tag position information for the one or more wireless tags attached to a print medium. The tag position information detection unit is, for example, a wireless communication device including an antenna different from the antenna 131. Such a wireless communication device may be configured integrally with the wireless tag communication device 13, or may be configured separately from the wireless tag communication device 13, for example.

When the image forming apparatus 1 includes a tag position information detection unit, ACT102 illustrated in FIG. 6 can be omitted. In this case, the image forming apparatus 1 detects information indicating the position on the print medium of the wireless tags attached to the print medium using radio waves emitted from the antenna. The image forming apparatus 1 performs the detection of the tag position information during a period beginning from the start of the processing of the ACT104 until the print medium is conveyed to the radiation region RA. The image forming apparatus 1 detects tag position information by radiating radio waves from the antenna to a second radiation region located upstream of the radiation region RA on the conveyance path LA. The method of detecting the information indicating the position of the wireless tags based on the radio wave radiated from an antenna may be any method. Therefore, particulars of a method of detecting information indicating the position of the wireless tag based on the radio wave radiated from an antenna will not be described.

The second modification can be combined with the first modification to reduce the amount of input operations to be performed by the user of the image forming apparatus 1.

The image forming apparatus 1 according to such a combination can also determine whether or not a conveyed print medium is a print medium that is usable in the image forming apparatus 1. The image forming apparatus 1 may be configured to stop conveyance, stop printing, stop writing of tag information to a wireless tag, or the like when it is determined that the print medium is not present in, or of an inappropriate type for, the image forming apparatus 1. In such a case, the image forming apparatus 1 may be configured to alert the user by displaying an error message on the display unit of the control panel 12. As a result, the image forming apparatus 1 can prevent printing, writing of tag information to a wireless tag, and the like from being performed on a print medium that cannot be used in the image forming apparatus 1. A print medium that cannot be used in the image forming apparatus 1 may be a print medium that is not specifically registered in the image forming apparatus 1, but is not limited thereto.

Third Modification

An image forming apparatus 1 according to a third modification determines whether the type of print medium type selected by the user is a print medium type usable in the image forming apparatus 1. More particularly, the image forming apparatus 1 determines whether the user selected print medium is usable in the image forming apparatus 1 based on the type of the print medium specified in ACT101.

For example, when the tag position information associated with the selected type is not stored in the storage device 1102, the image forming apparatus 1 determines that the print medium is of a type that cannot be used in the image forming apparatus 1.

For example, when the print medium information associated with the selected type is not stored in the storage device 1102, the image forming apparatus 1 determines that the print medium is of a type that cannot be used in the image forming apparatus 1. When the image forming apparatus 1 determines that the print medium cannot be used in the image forming apparatus 1, the image forming apparatus 1 stops conveyance, printing, writing of tag information to a wireless tag, and the like. In this case, the image forming apparatus 1 alerts the user by displaying an error message on the display unit of the control panel 12. As a result, the image forming apparatus 1 can prevent writing of tag information to a wireless tag, and the like on a print medium which cannot be used in the image forming apparatus 1.

Fourth Modification

An image forming apparatus 1 according to the fourth modification includes a position and orientation changing mechanism that changes the position and/or orientation of the antenna 131. In this case, even when the wireless tag TGA obliquely intersects with the conveyance direction of the first print medium PRA, the image forming apparatus 1 can match the long axis of the wireless tag TGA with the polarization direction of the polarized wave radiated from the antenna 131. As a result, the image forming apparatus 1 can more reliably reduce the failures of writing the tag information to the wireless tag.

As described above, the image forming apparatus includes a conveyance unit, an antenna, a storage unit, and a control unit. The conveyance unit conveys a print medium to which one or more wireless tags are attached. The antenna radiates radio waves to a predetermined radiation region on a conveyance path. The storage unit stores polarization direction information indicating a polarization direction of a radio wave for each type of print medium. The control unit controls the antenna, causes the antenna to radiate polarized waves to a radiation region as radiation of radio waves, and writes tag information to each of one or more wireless tags in the radiation region. The control unit specifies the type of the print medium, reads the polarization direction information associated with the specified type of the print medium from the storage unit, and changes the polarization direction of the polarized wave radiated from the antenna based on the read polarization direction information. As a result, the image forming apparatus can reduce the failures in writing of the tag information to the wireless tag.

A program for realizing the above-described functions of an image forming apparatus 1 or the like may be recorded in a non-transitory, computer-readable recording medium, and the program may be read and executed by a computer system. A "computer system" in this context can include an operating system and additional hardware such as peripheral devices. A "computer-readable recording medium" in this context refers to a portable medium such as a flexible disk, a magneto-optical disk, or a ROM, CD (Compact Disk)-ROM, or a storage device such as a hard disk incorporated in a computer system. The "computer-readable recording medium" may be a computer system serving as a server or a client when the program is transmitted via a network such as the Internet or a communication line such as a telephone line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet conveying apparatus, comprising:
   a sheet conveyance unit configured to transport a sheet along a conveyance path; and
   an antenna configured to emit a first linearly polarized radio wave and a second linearly polarized radio wave towards the conveyance path, the first linearly polarized radio wave and the second linearly polarized radio wave are different in wave polarization directions.

2. The sheet conveying apparatus according to claim 1, further comprising:
   a controller configured to control the antenna to emit:
      the first linearly polarized radio wave toward a sheet of a first type in the conveyance path, and
      the second linearly polarized radio wave toward a sheet of a second type in the conveyance path.

3. The sheet conveying apparatus according to claim 2, wherein
   the sheet of the first type has a first wireless tag,
   the sheet of the second type has a second wireless tag, and
   a gain of the first wireless tag with the first linearly polarized radio wave is higher than a gain of the second wireless tag with the first linearly polarized radio wave.

4. The sheet conveying apparatus according to claim 3, wherein a gain of the first wireless tag with the second linearly polarized radio wave is lower than a gain of the second wireless tag with the second linearly polarized radio wave.

5. The sheet conveying apparatus according to claim 2, wherein
   the sheet of the first type has a first wireless tag at a first region thereof,
   the sheet of the second type has a second wireless tag at a second region thereof, and
   a gain in the first region in the sheet of the first type with the first linearly polarized radio wave is higher than a gain of the second region in the sheet of the second type with the first linearly polarized radio wave.

6. The sheet conveying apparatus according to claim 5, wherein a gain in the first region in the sheet of the first type with the second linearly polarized radio wave is lower than a gain in the second region in the sheet of the second type with the second linearly polarized radio wave.

7. The sheet conveying apparatus according to claim 1, wherein the first linearly polarized radio wave is vertically polarized, and the second linearly polarized radio wave is horizontally polarized.

8. The sheet conveying apparatus according to claim 1, wherein the antenna has a first feeding point and a second feeding point, and emits the first linearly polarized radio wave when power is supplied to the first feeding point and the second linearly polarized radio wave when power is supplied to the second feeding point.

9. The sheet conveying apparatus according to claim 1, further comprising:
   a wireless tag communication device connected to the antenna and configured to write information to a wireless tag on the sheet on the conveyance path using radio waves emitted by the antenna.

10. The sheet conveying apparatus according to claim 9, further comprising:
    a printing unit configured to form an image on the sheet.

11. The sheet conveying apparatus according to claim 1, further comprising:
    a printing unit configured to form an image on the sheet.

12. A sheet conveying apparatus, comprising:
    a sheet conveyance unit configured to transport sheets of a first type and a second type along a conveyance path;
    an antenna configured to emit a first linearly polarized radio wave and a second linearly polarized radio wave towards the conveyance path, the first linearly polarized radio wave and the second linearly polarized radio wave are different in wave polarization directions; and
    a controller configured to control the antenna to emit the first linearly polarized radio wave towards the conveyance path when a sheet of the first type is on the conveyance path and the second linearly polarized radio wave towards the conveyance path when a sheet of the second type is on the conveyance path.

13. The sheet conveying apparatus according to claim 12, wherein
    the sheet of the first type has a first wireless tag,
    the sheet of the second type has a second wireless tag, and
    a gain of the first wireless tag with the first linearly polarized radio wave is higher than a gain of the second wireless tag with the first linearly polarized radio wave.

14. The sheet conveying apparatus according to claim 13, wherein a gain of the first wireless tag with the second linearly polarized radio wave is lower than a gain of the second wireless tag with the second linearly polarized radio wave.

15. The sheet conveying apparatus according to claim 12, wherein the first linearly polarized radio wave is vertically polarized, and the second linearly polarized radio wave is horizontally polarized.

16. The sheet conveying apparatus according to claim 12, wherein the antenna has a first feeding point and a second feeding point, and emits the first linearly polarized radio wave when power is supplied to the first feeding point and the second linearly polarized radio wave when power is supplied to the second feeding point.

17. The sheet conveying apparatus according to claim 12, further comprising:

a wireless tag communication device connected to the antenna and configured to write information to a wireless tag on the sheet on the conveyance path using radio waves emitted by the antenna.

18. The sheet conveying apparatus according to claim 17, further comprising:

a printing unit configured to form an image on the sheet.

19. The sheet conveying apparatus according to claim 12, further comprising:

a printing unit configured to form an image on the sheet.

20. The sheet conveying apparatus according to claim 19, wherein the antenna has a first feeding point and a second feeding point, and emits the first linearly polarized radio wave when power is supplied to the first feeding point and the second linearly polarized radio wave when power is supplied to the second feeding point.

* * * * *